(12) United States Patent
Wittek

(10) Patent No.: US 10,853,832 B2
(45) Date of Patent: Dec. 1, 2020

(54) SYSTEM AND METHOD FOR REMINDING AND TRACKING USE OF REUSABLE CONTAINER AND CARRY PRODUCTS

(71) Applicant: Matthew Frank Wittek, Guelph (CA)

(72) Inventor: Matthew Frank Wittek, Guelph (CA)

( * ) Notice: Subject to any disclaimer, the term of this patent is extended or adjusted under 35 U.S.C. 154(b) by 542 days.

(21) Appl. No.: 14/492,986

(22) Filed: Sep. 22, 2014

(65) Prior Publication Data
US 2015/0088620 A1 Mar. 26, 2015

Related U.S. Application Data

(60) Provisional application No. 61/880,477, filed on Sep. 20, 2013, provisional application No. 62/003,359, filed on May 27, 2014.

(51) Int. Cl.
*G06Q 30/02* (2012.01)

(52) U.S. Cl.
CPC .............. *G06Q 30/0207* (2013.01)

(58) Field of Classification Search
CPC ................................................. G06Q 30/0207
USPC ........................................................ 705/14.31
See application file for complete search history.

(56) References Cited

U.S. PATENT DOCUMENTS

| 2011/0133947 A1* | 6/2011 | Kraguljac | G08B 21/24 340/686.6 |
| 2012/0066156 A1* | 3/2012 | Pryor | G06Q 20/20 705/500 |

* cited by examiner

*Primary Examiner* — Azam A Ansari
(74) *Attorney, Agent, or Firm* — Tai W. Nahm; Miller Thomson LLP

(57) ABSTRACT

The present disclosure relates to a system and method for reminding users to use, and for tracking usage of, reusable container and carry products such as reusable bags, boxes, cups, cup sleeves, and bottles, especially for food and beverages. In an aspect, the system and method provides an identification module which may be attached to or embedded within a reusable container or carry product. The identification module is preferably adapted to be detected by or be operatively connect to a mobile communication device such as a smart phone, smart watch, tablet, or some other device form factor. An app provided on the mobile communication device is used to provide a schedule or location based reminder to use the reusable product, and may track usage and environmental impact for an individual user or a group of users. Promotional incentives, rewards, and prepayment options may be provided.

8 Claims, 12 Drawing Sheets

2Carrots™ is a mobile app that turns forgettable bags, cups, & mugs into unforgettable reusables that:

We work with brands to deliver targeted advertising in store:

Arriving in parking lot

Scanning Bag

If customer scans when they are not at a retail location

If customer scans at a retail location they earn rewards and product offers

After 2nd Scan (next visit)
User earns 1 or more rewards
each time they reuse

Set geo or time based reminders

Users can request a payment when their account reaches $10

SYSTEM AND METHOD FOR REMINDING AND TRACKING USE OF REUSABLE CONTAINER AND CARRY PRODUCTS

FIELD OF THE INVENTION

The present disclosure relates generally to a system and method for reminding users to use, and tracking usage of, reusable container and carry products, such as reusable bags, boxes, cups, cup sleeves, and bottles.

BACKGROUND

Presently, a wide range of reusable products are being promoted by various retailers and consumer products companies as a way to be more environmentally friendly, and to reduce unnecessary waste headed for garbage dumps, landfills, or to a garbage incinerator for destruction. For example, many grocery stores now offer reusable grocery bags in order to reduce the number of conventional plastic bags used for carrying customer groceries.

However, consumers often forget to bring their reusable container or carry products back to retailers on their next shopping trip, and either end up having to repeatedly buy additional reusable products, or asking for conventional, non-reusable container or carrying products instead. This can greatly diminish or defeat the effectiveness of the reusable products in reducing waste.

Furthermore, when reusable container or carry products are brought on shopping trips, it is difficult for retailers to determine usage patterns, or how effective their promotions involving reusable container or carry products may be.

Therefore, what is needed is an improved system and method for addressing at least some of these limitations in the prior art.

SUMMARY

The present disclosure relates to a system and method for reminding users to use, and for tracking usage of, reusable container and carry products such as reusable bags, boxes, cups, cup sleeves, and bottles.

In an aspect, the system and method provides an electronic identification module which may be attached to or embedded within a reusable container or carry product. The electronic identification module may comprise, for example, a Radio Frequency Identification Device (RFID) which may be used to uniquely identify a reusable container or carry product. Other possible technologies for the electronic identification module include Near Field Communications (NFC) and Bluetooth, for example. Another type of unique identifier may also be used.

The electronic identification module may be active or passive, and is preferably adapted to operatively connect with a mobile communication device or an adapter for such a mobile communication device. The mobile communication device may be, for example, a smart phone, smart watch, tablet, or some other device form factor.

In an embodiment, a calendar or alarm clock app running on the mobile communication device may be programmed to remind a user to bring along a reusable container or carry product in accordance with one or more entries in a calendar or an alarm clock app, or by detecting the geographic location of the mobile communication device.

In another embodiment, the electronic identification module attached to or embedded in a reusable container or carry product communicates with the mobile communication device, either directly or through a suitable adapter, such that usage of the reusable container or carry product can be recorded.

Alternatively, the electronic identification module attached to or embedded in a reusable container or carry product may communicate directly with a vendor's system at a retail location in order to track usage based on location of a retail store.

In another embodiment, the present system and method may be adapted to track usage of reusable containers or carry products, and to provide a reward or incentive for regular usage. For example, loyalty points may be collected each time a reusable container or carry product is used and may be redeemable to exchange for various rewards or prizes.

In another aspect, the present system and method allows tracking of the usage of reusable container or carry products by many users at a particular retail location, providing the retailer with feedback on how many of its customers are using reusable container or carry products. Alternatively, the present system and method allows tracking and usage of reusable container or carry products associated with a particular consumer brand company, allowing the company to collect statistics that are not necessarily tied down to one retailer.

In another embodiment, the electronic identification module may be adapted to be integrated with a mobile communication device such that a secure payment module on the mobile communication device may be used to pay for an item being carried or stored in a reusable container.

In another aspect, the present system and method promotes use of reusable items using a mobile communication device, and includes a reminder module for reminding a user to bring a reusable item; a reward module for rewarding the user for bringing the reusable item; and a tracking module for tracking use of the reusable item.

In this respect, before explaining at least one embodiment of the system and method of the present disclosure in detail, it is to be understood that the present system and method is not limited in its application to the details of construction and to the arrangements of the components set forth in the following description or illustrated in the drawings. The present system and method is capable of other embodiments and of being practiced and carried out in various ways. Also, it is to be understood that the phraseology and terminology employed herein are for the purpose of description and should not be regarded as limiting.

DETAILED DESCRIPTION

Figure 1:
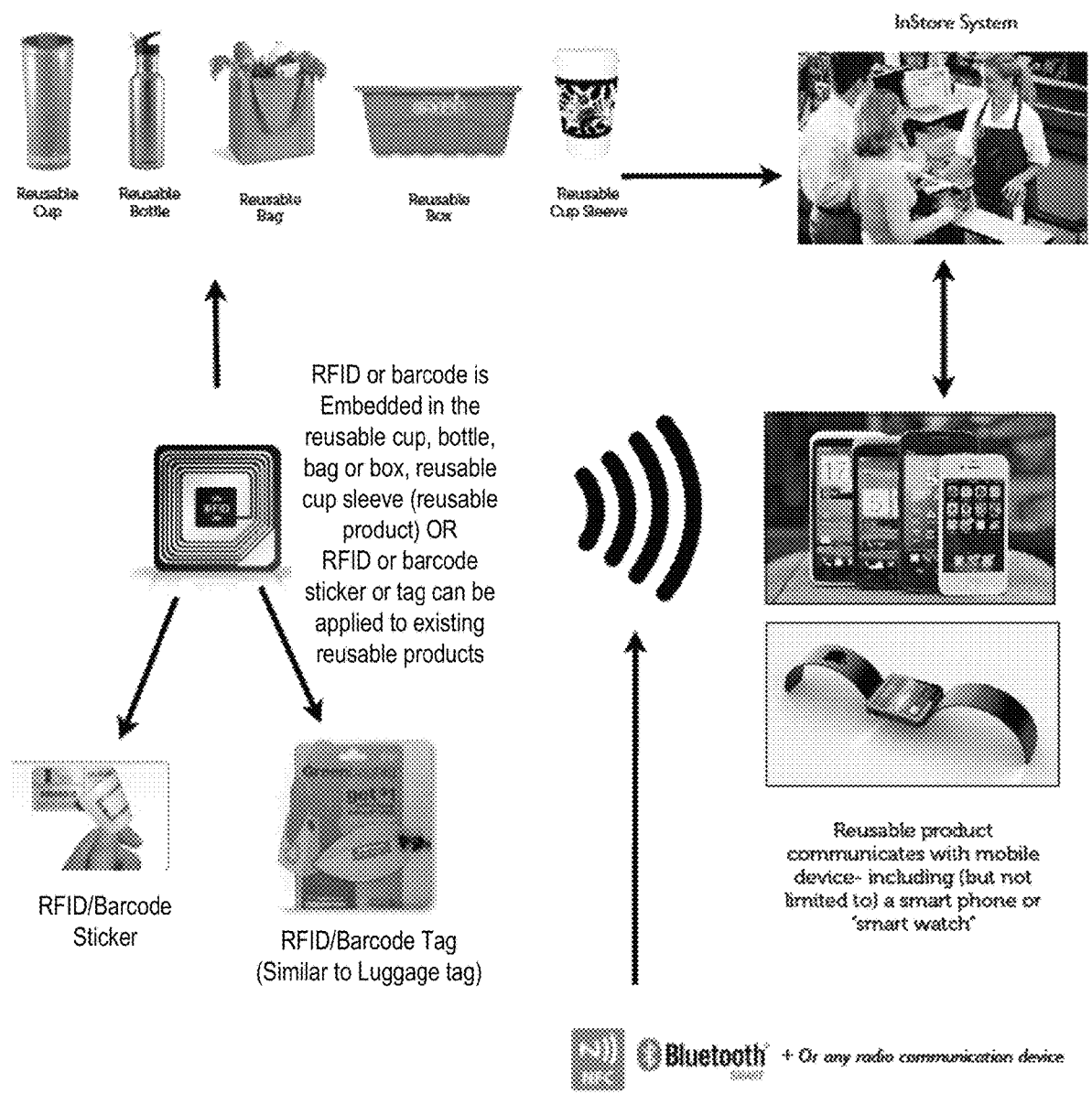
FIG. 1 shows a schematic block diagram of a system architecture in accordance with an embodiment.

As noted above, the present disclosure relates to a system and method for reminding users to use, and tracking usage of, reusable container and carry products, such as reusable bags, boxes, cups, cup sleeves, and bottles.

In an aspect, the system and method provides an electronic identification module which may be attached to or embedded within a reusable container or carry product. The electronic identification module may comprise, for example, an electronic Radio Frequency Identification Device (RFID) tag, a security chip, or other electronic means which may be used to uniquely identify a reusable container or carry product.

The electronic identification module may be active, semi-passive, or passive, and is preferably adapted to operatively connect with a mobile communication device such as a smart phone, smart watch, tablet, or some other device form factor. The mobile communication device may require an adapter to interact with RFID, NFC, Bluetooth devices or tags, or other types of unique identifiers, or may have these capabilities built directly into the mobile communication device.

In an embodiment, an app running on the mobile communication device may be programmed to remind a user to bring along a reusable container or carry product in accordance with one or more entries in a calendar or alarm system. For example, if a user regularly visits a coffee shop each weekday morning, an automatic reminder may be programmed to alert the user shortly before the user is scheduled to leave the house. If a user schedules a regular visit to the grocery store on a weekly basis, then an automatic reminder may be programmed to alert the user to bring along one or more reusable grocery bags shortly before the regular time.

In an embodiment, the electronic identification module attached to or embedded in a reusable container or carry product communicates with the mobile communication device, such that usage of the reusable container or carry product can be recorded. For example, the electronic identification module may be attached to or embedded in a reusable container such as a coffee cup. Each time the reusable coffee cup is reused at a coffee shop, the electronic identification module uniquely identifying the reusable coffee cup can be scanned, and usage of the coffee cup can be recorded in a database collecting historical usage information.

Alternatively, the electronic identification module attached to or embedded in a reusable container or carry product may communicate directly with a vendor's system at a retail location in order to track usage based on location of a retail store. This would allow a retail store to track usage of its reusable container or carry product even if the retail store does not know the identity of the user. As an example, an RFID sensor may be placed near the entrance to a retail store to sense any RFID tags attached or embedded within any reusable container or carry products being carried into the store. Optionally, upon associating an RFID tag with a user through the user's communication device, the retail store may then track the identity of the individual coming into the store based on the RFID tag.

In an embodiment, the present system and method may be adapted to track usage of reusable containers or carry products, and to provide a reward or incentive in accordance with points collected in a loyalty program. For example, rather than having a loyalty card, frequent usage of a reusable coffee cup may be tracked and rewarded, for example with a free coffee after every 10 cups purchased using the reusable coffee cup.

In another respect, the present system and method allows tracking of the usage of reusable container or carry products by many users at a particular retail location, providing the retailer with feedback on how many of its customers are using reusable container or carry products. Alternatively, the present system and method allows tracking and usage of reusable container or carry products associated with a particular consumer brand company, allowing the company to collect statistics that are not necessarily tied down to one retailer.

In another embodiment, the electronic identification module may be adapted to be integrated with a mobile communication device such that a secure payment module on the mobile communication device may be used to pay for an item being carried or stored in a reusable container. For example, an electronic identification module embedded in a coffee cup may be adapted to be identified by a secure payment module on a user's mobile communication device as being a large-size coffee container. Based on pricing information supplied by a retailer for a large coffee, the payment may be made automatically at a checkout location, with or without a cashier.

In another aspect, the present system and method allows retailers and consumer products companies to track usage of reusable container or carry products that they may distribute, in order to determine how successful a marketing campaign has been. In addition, by bringing along a reusable container or carry product with an electronic identification module associated with a particular retailer, or with a particular consumer products company, the retainer or company can make special offers to a user through an app running on the mobile communication device.

In another embodiment, in addition to or in lieu of the electronic identification module, an optical identification means such as barcodes or QR codes may also be used to mark the reusable container or carry product. Such a barcode or QR code may be read both by the user's mobile communication device, and a vendor's in store system.

The present system and method will now be described in more detail with reference to the figures.

Shown in FIG. 1 is a schematic block diagram of an illustrative system architecture in accordance with an embodiment. As shown, various reusable container and carry products may include a reusable cup, cup sleeve, bottle, bag or box, for example. These various reusable container and carry products may include an RFID embedded directly into the products, or alternatively an RFID sticker or tag (or anything that may be attached) that may be attached to the reusable container or carry product. The RFID may be an active type powered by a battery, a battery assisted passive type, or a passive type with no power source. Operating distance of the embedded or attached RFID may range from about 100 meters for an active RFID type, to about 10 meters for a passive RFID type. With a suitable battery, an active RFID chip may be powered for up to a number of years, adequately covering the expected life of a reusable container or carry product. Therefore, whether attached to a reusable container or carry product as a tag or sticker, or embedded within the reusable container or carry product, the RFID provides an effective way to track the reusable container or carry product.

In an embodiment, the present system and method may periodically check to confirm if a reusable container or carry product is within range of an RFID sensor on a mobile communication device, and to alert a user of a mobile communication device if the reusable container or carry product is out of range.

Figure 2:
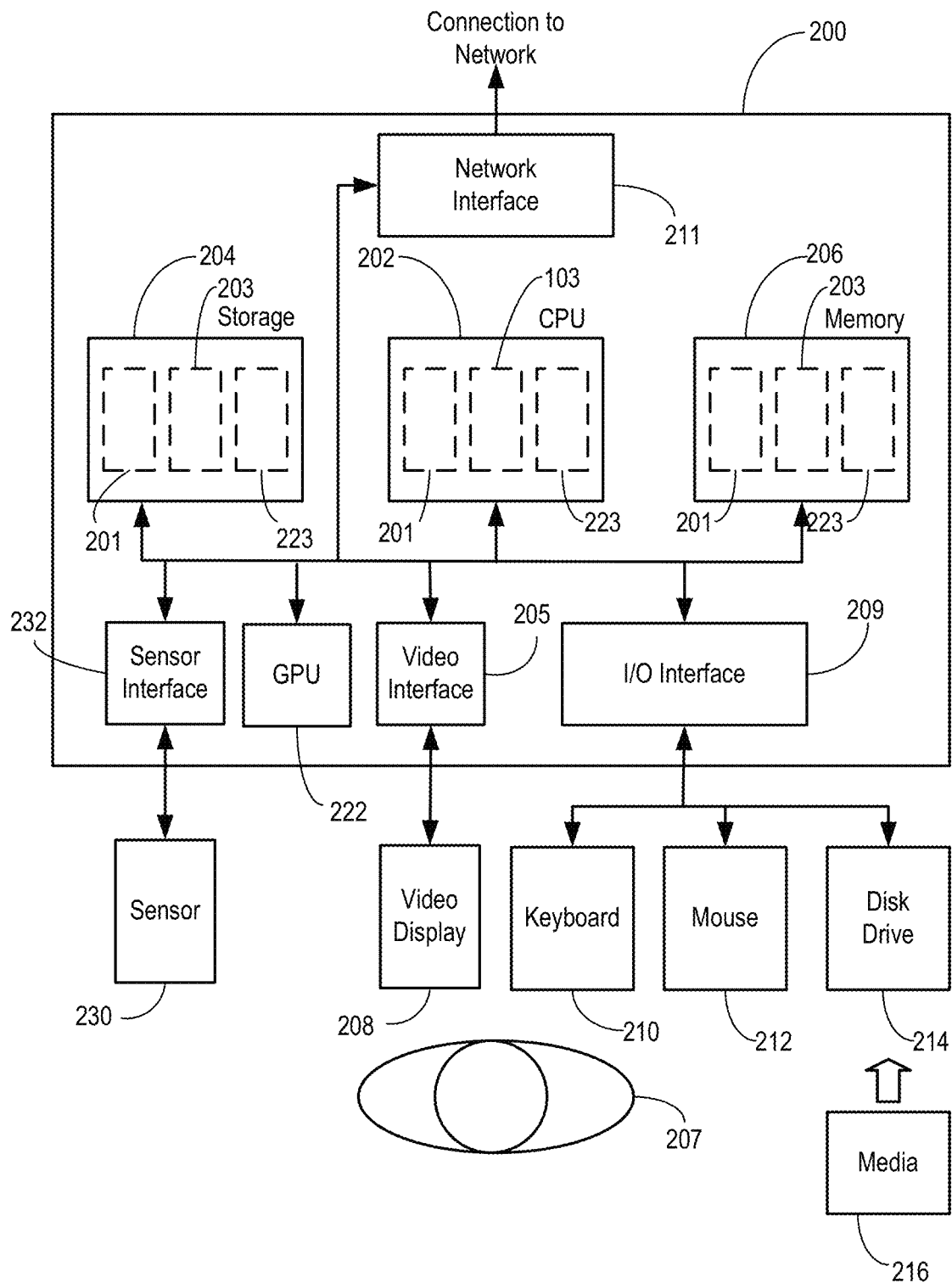
FIG. 2 shows a schematic block diagram of a generic computer device in accordance with an embodiment.

Now referring to FIG. 2, the present system and method may be practiced in various embodiments. A suitably configured computer device, and associated communications networks, devices, software and firmware may provide a platform for enabling one or more embodiments as described above. By way of example, FIG. 2 shows a generic computer device 200 that may include a central processing unit ("CPU") 202 connected to a storage unit 204 and to a random access memory 206. The CPU 202 may process an operating system 201, application program 203, and data 223. The operating system 201, application program 203, and data 223 may be stored in storage unit 204 and loaded into memory 206, as may be required. Computer device 200 may further include a graphics processing unit (GPU) 222 which is operatively connected to CPU 202 and to memory 206 to offload intensive image processing calculations from CPU 202 and run these calculations in parallel with CPU 202. An operator 207 may interact with the computer device 200 using a video display 208 connected by a video interface 205, and various input/output devices such as a keyboard 210, pointer 212, and storage 214 connected by an I/O interface 209. In known manner, the pointer 212 may be configured to control movement of a cursor or pointer icon in the video display 208, and to operate various graphical user interface (GUI) controls appearing in the video display 208. The computer device 200 may form part of a network via a network interface 211, allowing the computer device 200 to communicate with other suitably configured data processing systems (not shown). One or more different types of sensors 230 connected via a sensor interface 232 may be used to search for and sense input from various sources. The sensors 230 may be built directly into the generic computer device 200, or optionally configured as an attachment or accessory to the generic computer device 200.

One or more application programs 203 on the generic computer device 200 may be adapted to perform the functions described in this specification, including but not limited to a scanning module for scanning for and sensing an electronic identification module, a reminder module for reminding use of a reusable container or carry product, a tracking module for tracking use of a reusable container or carry product at a retail store, and a vendor interface module for interacting with a vendor's system. The one or more application programs 203 may be adapted to interact with any of the components of the generic computer device 200 as may be necessary to perform their intended functions.

The present system and method may be practiced on virtually any manner of mobile computer device including laptop computer, tablet, smart phone or smart watch. The present system and method may also be implemented as a computer-readable/useable medium that includes computer program code to enable a computer device to implement each of the various process steps in a method in accordance with the present invention. It is understood that the terms computer-readable medium or computer useable medium comprises one or more of any type of physical embodiment of the program code.

Figure 3:
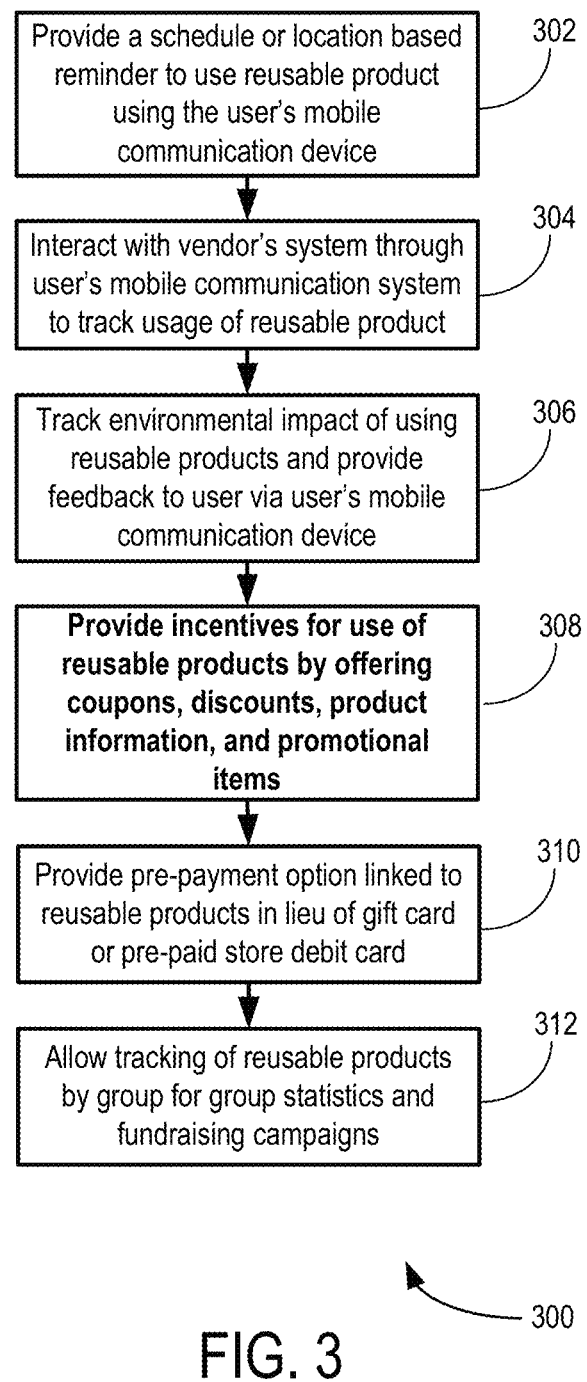
FIG. 3 shows a schematic flow chart of an illustrative method in accordance with an embodiment.

Now referring to FIG. 3, shown is a schematic flow chart of an illustrative method 300 in accordance with an embodiment. As shown, method 300 begins at block 302, where method 300 provides a schedule or location based reminder to use reusable product using the user's mobile communication device.

At block 304, method 300 interacts with vendor's system through user's mobile communication system to track usage of reusable product.

At block 306, method 300 tracks environmental impact of using reusable products and provide feedback to user via user's mobile communication device.

At block 308, method 300 provides incentives for use of reusable products by offering coupons, discounts, and promotional items.

At block 310, method 300 provides a pre-payment option linked to reusable products in lieu of gift card or pre-paid store debit card.

At block 312, method 300 allows tracking of reusable products by group for group statistics and fundraising campaigns.

Various illustrative examples will now be described to explain the features and functions of the present system and method in more detail.

Schedule Based Reminder System—

In a first illustrative example, the present system and method may provide a schedule based reminder system provided on the user's mobile communication device. For example, suppose that a user is a regular customer of a local coffee shop on weekday mornings. Before leaving his or her home, an app on the user's smart phone is pre-programmed to remind the user to bring a reusable container or coffee cup each weekday morning. This reminder may be provided in any number of ways, including an alarm clock function, an email reminder, a text message, or some other means by which the user will be alerted each weekday morning. As a further incentive to bring along the reusable coffee cup to the coffee shop, the reminder via the user's smart phone may notify the user that they have a free coffee that day given the number of cups of coffee previously purchased, or that they need only one more purchase using the reusable container before qualifying for a free cup of coffee. Alternatively, a coupon for a discounted cup of coffee or a free coffee may be sent to the user along with their daily reminder in order to provide an incentive for the user to bring along the reusable container.

Location Based Reminder System—

As another example, the user's smart phone may be adapted to provide a location based reminder system. For example, the user's smart phone may be adapted to detect whether or not a reusable coffee cup is within its vicinity using an electronic identification module sensor. If a reusable coffee cup is not detected within range as a user enters a car and prepares to leave for work, an alert may be raised for the user to retrieve the reusable coffee cup before departing the house. Alternatively, the user's smart phone may use a GPS based reminder system to send a reminder to the user to bring a reusable product as they leave the house, or as they leave their car in a parking lot of a retailer. This GPS based reminder system may be combined with the detection of the electronic identification module within range of the smart phone to determine whether or not to issue an alert.

Interaction with Vendor's System—

As the user arrives at the coffee shop, the user's smart phone may communicate with the coffee vendor's in store system. Alternatively, the user's smart phone may also communicate with a coffee vendor's remotely located system accessible via the mobile Internet. The user's smart phone is also able to operatively connect to the electronic identification device in the reusable coffee cup, such that the identity of the reusable coffee cup is readily known to the vendor's system. If the coffee vendor's system cannot directly sense the electronic identification module embedded in the coffee cup, an app on the smart phone may provide a way for the identity of the reusable coffee cup to be made available via another format, such as a conventional barcode or a two-dimensional barcode system such as the Quick Response (QR) code.

In an embodiment, the interaction between the vendor's system, the user's smart phone, and the embedded electronic identification device in the reusable coffee cup is substantially automated, such that minimal effort is required on the part of the user or vendor to keep track of the number of times the coffee cup has been reused. This minimal effort may require the user to ensure that the short range communication features on the mobile communication device are turned on such that the mobile communication device may interact wirelessly with the vendor's system, and that a tracking app is currently active for tracking the usage of the reusable container. For added security, the user's smart phone may be equipped with a biometric sensor such as a fingerprint sensor, or other security feature such as facial image recognition before the tracking app on the user's mobile communication device and the vendor's system is permitted to connect.

Environmental Impact Tracking

In another aspect, the present system and method may provide users with a way to track the environmental impact that they have had by using a reusable product. For example, the tracking may provide feedback on how many plastic or paper bags, or disposable cups have they eliminated from landfill, how many trees they have saved, what the $CO_2$ reduction is, etc. This could apply to a single user, or a group of users at a store, a school, a community group, or even a country.

Coupons

Either in conjunction with the schedule based or location based reminder systems described above, or independently, the present system and method may be adapted to provide incentives to keep and use the reusable container and carry products. For example, users can receive automatic coupons, discounts, or recipes at home or when they are using their reusable container or carry product at a store.

Significantly, rather than being tied to a particular retailer, a consumer product company can establish a direct line of communication with a user of the reusable container or carry product to promote the company's consumer products. For example, a user may receive a branded soup bag from the soup manufacturer. When user uses the reusable bag at a store, they can receive an automatic coupon and/or recipe for the soup manufacturer's products via the user's smart phone. This may be initiated by the user through an app on their smart phone, by scanning a barcode or tapping on the electronic identification module on the reusable container or carry product with their mobile communication device, or initiated automatically as the user enters a retail store.

As another example, a retail store may provide a store branded reusable shopping bag and may offer a discount on the retail store's products each time the reusable shopping bag is used.

As another example, a user may receive a reusable shopping bag from a cable company promoting video on demand services which enables a user of the reusable shopping bag to download coupons for popcorn or candy from their local retail location, or free movies that may be downloaded online or through the cable system box.

As another example, a local coffee chain may advertise a 50% coupon for a menu item between 2 and 4 pm on each day, if a user brings along a reusable coffee cup. Each day the user could tap their coffee cup with an embedded electronic identification module to see what the deal of the day is. Other promotional programs offered by the coffee chain may be customized for reusable coffee cups only, such that prizes may only be available to reusable coffee cup users. If a particular prize is to be rewarded based on the customer's number (e.g. the 25th customer to use a reusable coffee cup in a coffee vendor's location on a particular day), then the vendor's in store system may be adapted to keep track of usage and to notify the winner as they order or pay for their coffee.

As another example, the present system and method facilitates fundraising by allowing tracking of usage of reusable container and carry products by a large group of users. For example, a school undertaking a fundraising campaign may distribute reusable container or carry products to parents and the local school community. Each time the reusable container is used at a local retailer, the retailer or brand may contribute a part of their proceeds towards a particular fundraising campaign or charity. This could be based on the total dollars spent at the retail locations, or simply counting the number of visits to the local retailer which has agreed to contribute a set dollar amount to the fundraising campaign or charity.

Pre-Payment

In another aspect, the present system and method allows a secure means of pre-paying for products or services utilizing the electronic identification module. This may allow a gift of not just the reusable container or carry product, but also goods that can be carried or contained by the reusable container or carry product. For example, a reusable coffee cup may be associated with pre-payment for ten cups of coffee which may be claimed at a corresponding coffee vendor. As another example, a shopping bag for a retailer may have a pre-payment stored within its electronic identification module which may replace a gift card. This may be a grocery store, or another retail store such as a women's clothing store, for example.

In another embodiment, rather than storing and tracking pre-payment information directly within a storage means in the electronic identification module, the electronic identification module need merely uniquely identify the reusable container or carry product, such that the appropriate value of goods may be redeemed over time after the pre-payment is verified remotely on a remotely located vendor system. This may provide the vendor with more control, and prevent fraudulent loading of pre-payment information within an electronic identification module.

Figure 4A:
FIGS. 4A and 4B illustrate an overview of a method and system for reminding, rewarding, and educating consumers on the ecological impact of their use of reusable containers or carry products.
Figure 4B:
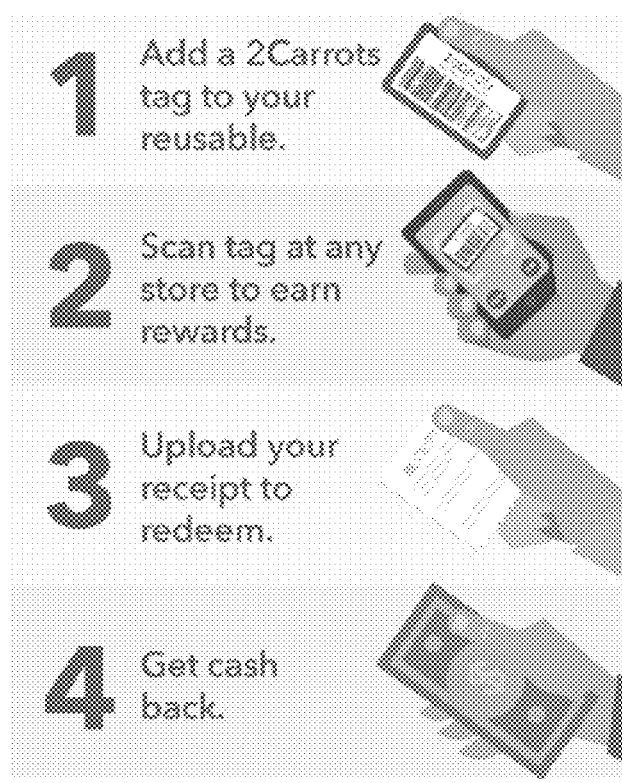

In summary, as graphically illustrated in FIGS. 4A and 4B, the present system and method is adapted to provide the following features and functions:
1) Remind customers to bring their reusable container and carry products with them;
2) Offer rewards or incentives for customers to keep and reuse their reusable container and carry products by providing discounts, product information, and coupons for goods and services when using their reusable products; and
3) Track and educate the environmental impact a customer or community is making by using reusable container and carry products.

In addition, the system and method may be adapted to offer fundraising incentives for a group of customers to use reusable products together.

By encouraging and facilitating use of reusable container and carry products, the system and method offers savings through coupons or discounts, or by not having to pay for the number of bags used. The system and method can also be used to provide product information, prizes, support fundraising efforts, and educate users regarding the environmental impact they are having.

Figure 5C:
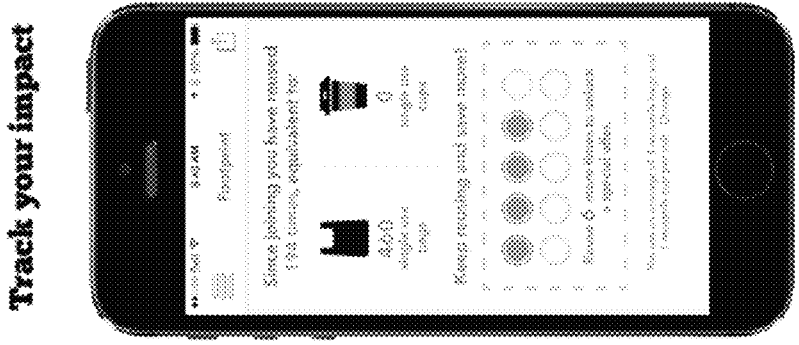
FIGS. 5A to 5C show screen captures of a mobile device for illustrating setting reminders for reuse, earning rewards for reuse, and tracking ecological impact of reuse.
Figure 5B:
Figure 5A:
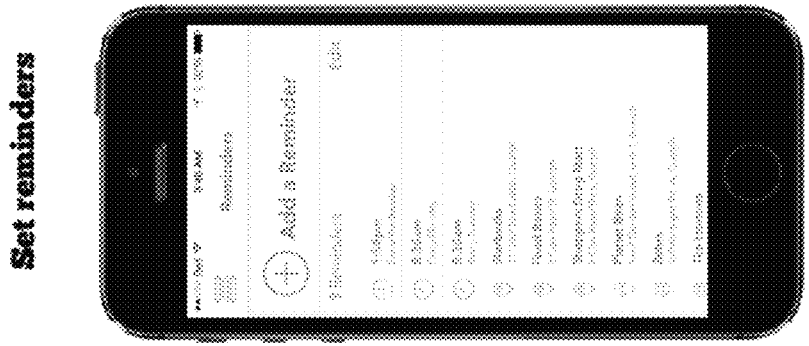

FIGS. 5A to 5C show screen captures of a mobile device for illustrating setting reminders for reuse, earning rewards for reuse, and tracking ecological impact of reuse.

Referring to FIG. 5A, reminders may be set for a particular time, for a particular store, and may be repeated regularly. For example, a reminder may be provided each morning at a set time to bring a reusable coffee mug for the regular coffee shop during the morning commute into work. As another example, a reminder may be provided weekly for a regular trip to the grocery store.

Referring to FIG. 5B, rewards may be offered for specific products when the user arrives onsite with a reusable container or carry product. For example, a reusable coffee cup may provide the user with a discount at the coffee shop, or a free coffee after buying a specified number of cups of coffee at the location, as tracked by the system. In a grocery store or a drug store, the system and method may advertise specific branded products available for bringing a reusable container or carry product, and scanning the identification module upon arrival at the store. This provides a further incentive for the user to remember to bring their reusable container or carry product each and every time.

FIG. 5C shows an illustrative example of a screen showing the positive ecological impact resulting from the user's reuse. In addition to coupons and promotional items offered by brands at a store, regular reuse of a reusable container or carry product may also trigger a special offer upon reaching a specified number of reuses.

Figure 6:
FIG. 6 shows screen captures of a mobile device for illustrating targeted brand advertising to customers in a store.

Now referring to FIG. 6, shown is an illustrative example of targeted brand advertising delivered to users/customers when they scan an identification module of a reusable container or carry product at a store. Multiple branded products may be offered to provide the user with a choice on which products to purchase on a shopping trip.

Now referring to FIGS. 7A to 7L, shown are screen captures of a mobile device for illustrating the method and system in use in accordance with an embodiment.

Figure 7A:
FIGS. 7A to 7L show screen captures of a mobile device for illustrating the method and system in use in accordance with an embodiment.

Referring to FIG. 7A, upon arrival at a parking lot, the system and method is adapted to trigger an alert, in a pop-up window for example, to remind the user to scan the identification module of their reusable container or carry product. If the user has forgotten to bring their reusable container or carry product in this trip, they can indicate that they have forgotten it, and request a reminder to bring it on the next shopping trip.

Figure 7B:
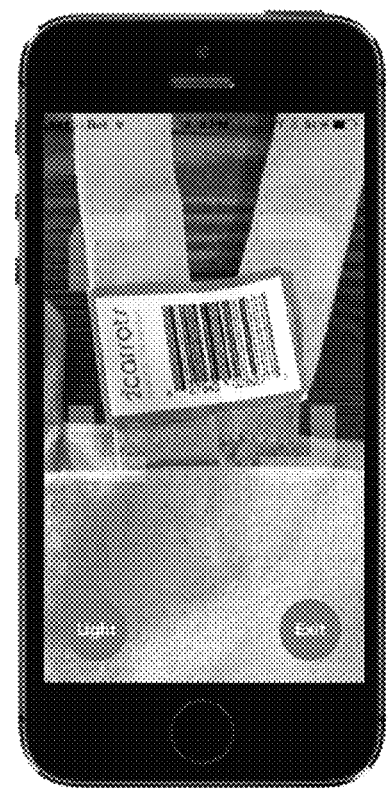

FIG. 7B illustrates scanning of the identification module, which in this illustrative example is a bar code tag attached to the strap of a reusable shopping bag. The system and method is configured to use the identification module to track reuse of the reusable shopping bag, and to track incentives offered through the system and method, and purchased by the user. Many other forms of identification modules are possible, including various types of wireless electronic identification modules as previously mentioned.

Figure 7C:

FIG. 7C shows an illustrative example of the system and method displaying an error message if a user attempts to scan the identification module while not at a retail location. This may be done to encourage the user to first come to the retail location before they can learn which promotions and incentives may be available. However, in an alternative embodiment, the system and method may allow the user to identify a particular store from home before making a trip, to see if there are any promotional items that would make the trip to the store worthwhile.

Figure 7D:

FIG. 7D shows an illustrative example of the system and method displaying rewards and product offers for scanning the identification module of the reusable container or carry product at a retail store. In an embodiment, certain rewards or product offers may be offered for a limited time, such as being available only during a particular shopping trip. Other rewards or product offers may be offered for an extended period, and may be saved in the system for use on the next shopping trip, for example.

Figure 7E:
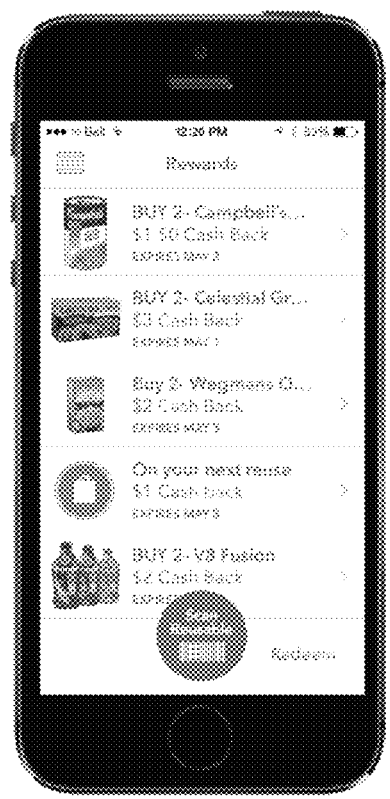

FIG. 7E shows an illustrative example of the system and method displaying rewards or product offers that may increase on a second or subsequent visit, such that users earn more rewards for more frequent reuse of reusable containers and carry products at a particular store.

Figure 7F:
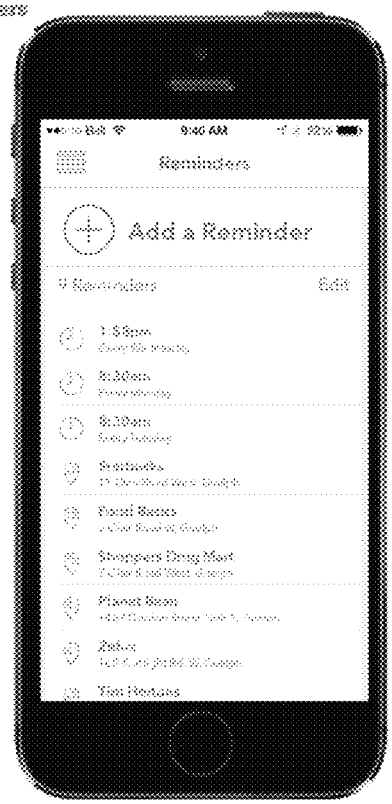
Figure 7G:

Now referring to FIGS. 7F and 7G, shown is an illustrative example of the system and method displaying screens for adding one or more reminders. Certain reminders may be set based on time, while other reminders may be set based on the geographic location. Thus, for example, arriving in the parking lot of a particular store may set off a geographically triggered reminder to scan and bring in a reusable container or carry product.

Figure 7H:
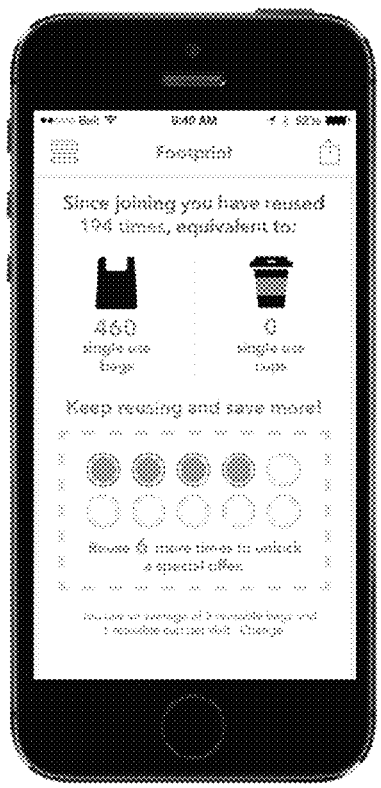

Now referring to FIG. 7H, shown is an illustrative example of the system and method displaying the positive ecological impact of the user's reuse of containers and carry products. In this illustrative example, the system and method counts the number of times a reusable container or carry product has been used, and may provide the equivalent number of single use containers or carry products which have been saved from becoming garbage.

Figure 7I:

FIG. 7I shows an illustrative example of the system and method displaying a screen for taking a digital image of a store receipt for providing proof of purchase of a product which is eligible for a reward or promotional offer. This option allows a brand manufacturer or seller to readily honour a coupon or promotion without necessarily having to rely on participation from a retailer carrying their products. The brand manufacturer or seller thus is able to reimburse a consumer directly through the present system and method. In an alternative embodiment, participation of a retailer may allow the consumer to receive a discount at the point of sale at the store's check-out.

Figure 7J:
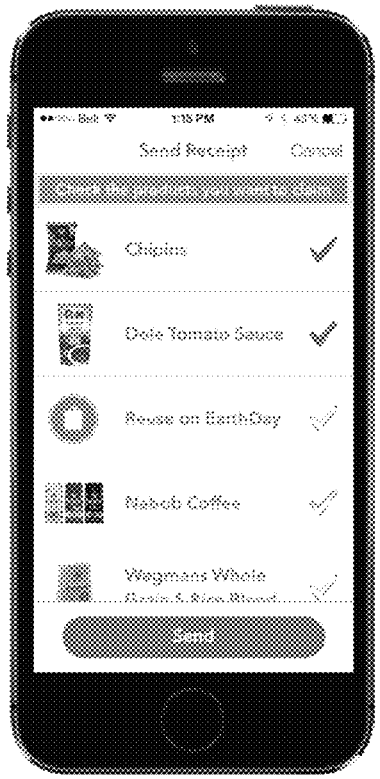

Now referring to FIG. 7J, shown is an illustrative example of the system and method displaying receipts that have been stored for sending to a brand manufacturer or seller. This option allows the user to collect a number of receipts and send for reimbursement at the same time, rather than sending the receipts for each item.

Figure 7K:
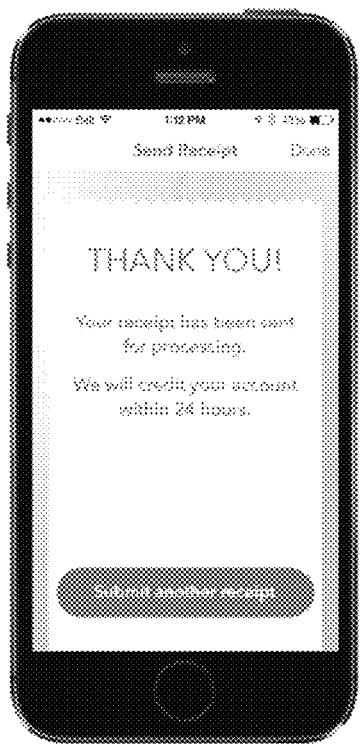
Figure 7L:
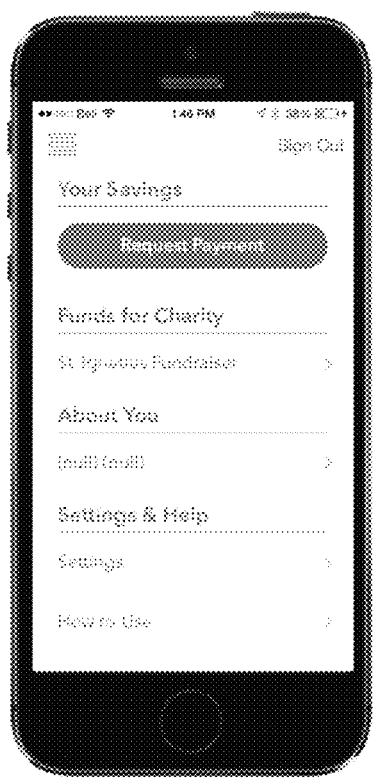

FIG. 7K shows an illustrative example of the system and method displaying a screen for confirming that one or more receipts have been sent for processing by the system and method. In an embodiment, the system and method may be configured to credit payment to a user's account on the system. In order to avoid excessive transactional charges on relatively small amounts, FIG. 7L shows an illustrative example of the system and method displaying a screen in which users can request a payment only after reaching a certain predetermined amount, such as $10 for example. The payment may be made to a user's bank account, a debit card, or through an online payment system such as PayPal®, for example. The user may also be provided with an option to alternatively send the requested amount to a charity in lieu of receiving the payment themselves.

While certain terms have been used to make reference to various reusable containers and carry products, it will be appreciated that these terms are not meant to be limiting, and that the present system and method may be utilized with a full range of reusable products. For example, bags also refers to totes, packs and sacks; boxes also refers to collapsible boxes or cartons; reusable cups also refers to mugs, travel mugs, eco mugs, and eco cups; and reusable bottles also refers to travel bottles, eco bottles, collapsible bottles, etc. In addition, reusable containers may also refer to any type of reusable container for carrying food products or other consumable items. Other types of reusable items that may be tracked using the present system and method include products such as towels, cloth napkins, and utensils, which may be used in place of plastic, cardboard or paper-based disposable products.

Furthermore, it should be understood that various enhancements to the disclosed system, method and computer program are envisioned, and the illustrative embodiments are not meant to be limiting.

Thus, in an aspect, there is provided a system for promoting use of reusable items, the system embodied in a mobile communication device having a processor and a memory, comprising: a reminder module for issuing a reminder to bring a reusable item; a reward module for rewarding the user for bringing the reusable item, the reward module adapted to generate a reward upon detecting the reusable item at a qualifying location; and a tracking module for tracking use of the reusable item over multiple reuses.

In an embodiment, the reminder module is adapted to trigger the reminder based on one or more of a pre-defined schedule or a current location of the mobile communication device.

In another embodiment, the reward module is adapted to detect the reusable item based on an identification module attached to the reusable item.

In another embodiment, the identification module is one or more of a bar code, QR-code, RFID, NFC, Bluetooth, or another type of unique identifier.

In another embodiment, the reward module is adapted to detect a qualifying location utilizing a GPS feature of the mobile communication device.

In another embodiment the reward module is adapted to generate a reward comprising one or more of a coupon, a discount, or loyalty points for reusing the reusable item.

In another embodiment, the reward module is further adapted to enable redemption of the coupon, discount or loyalty points by the user.

In another embodiment, the tracking module is adapted to track the number of reuses of the reusable item, and to calculate an environmental impact based on the number of reuses.

In another embodiment, the tracking module is further adapted to track a collective environmental impact of a group of users based on a total number of reuses by the group.

In another aspect, there is provided a method of promoting use of reusable items, the method executable on a mobile communication device having a processor and a memory, comprising: issuing a reminder to bring a reusable item; generate a reward upon detecting the reusable item at a qualifying location; and tracking use of the reusable item over multiple reuses.

In an embodiment, the method further comprises triggering the reminder based on one or more of a pre-defined schedule or a current location of the mobile communication device.

In another embodiment, the method further comprises detecting the reusable item is based on an identification module attached to the reusable item.

In another embodiment, the identification module is one or more of a bar code, QR-code, RFID, NFC, Bluetooth, or another type of unique identifier.

In another embodiment, the method further comprises detecting the qualifying location utilizing a GPS feature of the mobile communication device.

In another embodiment, the method further comprises generating as a reward for reusing the reusable item one or more of a coupon, a discount, or loyalty points.

In another embodiment, the method further comprises enabling redemption of the coupon, discount or loyalty points by the user.

In another embodiment, the method further comprises tracking the number of reuses of the reusable item, and to calculate an environmental impact based on the number of reuses.

In another embodiment, the method further comprises calculating a collective environmental impact of a group of users based on a total number of reuses by the group.

In another aspect, there is provided a mobile communication device for tracking use of reusable container and carry products, comprising: a reminder module for issuing a reminder to bring a reusable item; a reward module for rewarding the user for bringing the reusable item, the reward module adapted to generate a reward upon detecting the reusable item at a qualifying location; and a tracking module for tracking use of the reusable item over multiple reuses.

In an embodiment, the reminder module is adapted to trigger the reminder based on one or more of a pre-defined schedule or a current location of the mobile communication device.

The scope of the invention is thus defined by the following claims.

The invention claimed is:

1. A system for promoting and tracking reuse of physical reusable items by a user, the system embodied in a mobile communication device having a central processing unit, a memory, and a display, comprising:
    a detection module executable on the central processing unit and memory for detecting an identification module attached to the reusable item, the detection module adapted to detect the identification module attached to the reusable item based on a signal generated by one or more system sensors in response to the identification module and received by the detection module while at a qualifying geographic location, thereby to detect reuse of the reusable item at the qualifying geographic location;
    a reminder module executable on the central processing unit and memory for issuing a reminder to reuse the reusable item upon detecting that the reusable item is at the qualifying geographic location determined by utilizing a GPS feature of the mobile communication device;
    a tracking module executable on the central processing unit and memory for tracking reuse of the reusable item at the qualifying geographic location over multiple reuses by scanning the detected identification module for each use and communicating the multiple reuses to a remotely located system;
    a display module executable on the central processing unit and memory for immediately displaying on the display an environmental impact of reuse of the reusable item over multiple reuses, thereby to provide immediate feedback of the cumulative environmental impact of reuse to the user; and a reward module executable on the central processing unit and memory for issuing a reward for reuse of the reusable item upon detecting that the reusable item has been reused over multiple reuses to achieve a cumulative environmental impact.

2. The system of claim 1, wherein the identification module is one or more of a bar code, QR-code, RFID, NFC, Bluetooth, or another type of unique identifier.

3. The system of claim 1, wherein the tracking module is further adapted to track a collective environmental impact and a corresponding charitable impact of a group of users based on the total number of reuses by the user group.

4. A method of promoting and tracking reuse of physical reusable items by a user, the method executable on a mobile communication device having a central processing unit, a memory, and a display, comprising:

detecting reuse of the reusable item utilizing a detection module for detecting an identification module attached to the reusable item, the detection module executable on the central processing unit and memory to detect the identification module attached to the reusable item based on a signal generated by one or more system sensors in response to the identification module and received by the detection module while at a qualifying geographic location, thereby to detect reuse of the reusable item only at the qualifying geographic location;

issuing a reminder utilizing a reminder module executable on the central processing unit and memory to reuse the reusable item upon detecting that the reusable item is at the qualifying geographic location determined by utilizing a GPS feature of the mobile communication device;

tracking use of the reusable item at the qualifying geographic location over multiple reuses utilizing a tracking module executable on the central processing unit and memory by scanning the detected identification module for each use and communicating the multiple reuses to a remotely located system;

utilizing a display module executable on the central processing unit and memory and immediately displaying on the display an environmental impact of reuse of the reusable item over multiple reuses, thereby providing immediate feedback of the cumulative environmental impact of reuse to the user; and issuing a reward for reuse of the reusable item utilizing a reward module executable on the central processing unit and memory upon detecting that the reusable item has been reused over multiple reuses to achieve a cumulative environmental impact.

5. The method of claim 4, wherein the identification module is one or more of a bar code, QR-code, RFID, NFC, Bluetooth, or another type of unique identifier.

6. The method of claim 4, further comprising calculating a collective environmental impact and a corresponding charitable impact of a group of users based on the total number of reuses by the user group.

7. A system for promoting and tracking reuse of physical reusable items by a user, the system embodied in a mobile communication device having a central processing unit, a memory, and a display, comprising:

a detection module executable on the central processing unit and memory for detecting an identification module attached to the reusable item, the detection module adapted to detect the identification module attached to the reusable item based on a signal generated by one or more system sensors in response to the identification module and received by the detection module;

a reminder module executable on the central processing unit and memory for issuing a reminder to reuse the reusable item upon detecting that the reusable item is at the qualifying geographic location determined by utilizing a GPS feature of the mobile communication device;

a tracking module executable on the central processing unit and memory for tracking reuse of the reusable item over multiple reuses by scanning the detected identification module for each use; and a display module executable on the central processing unit and memory for immediately displaying on the display a graphical display of an environmental impact of reuse of the reusable item over multiple reuses, thereby to provide immediate feedback of the cumulative environmental impact of reuse to the user; and a reward module executable on the central processing unit and memory for issuing a reward for reuse of the reusable item upon detecting that the reusable item has been reused over multiple reuses to achieve a cumulative environmental impact.

8. A system for promoting and tracking reuse of physical reusable items by a user, the system embodied in a mobile communication device having a central processing unit, a memory, and a display, comprising:

a detection module executable on the central processing unit and memory for detecting an identification module attached to the reusable item, the detection module adapted to detect the identification module attached to the reusable item based on a signal generated by one or more system sensors in response to the identification module and received by the detection module;

a reminder module executable on the central processing unit and memory for issuing a reminder to reuse the reusable item upon detecting that the reusable item is at the qualifying geographic location determined by utilizing a GPS feature of the mobile communication device;

a tracking module executable on the central processing unit and memory for tracking reuse of the reusable item by scanning the detected identification module for each use;

a display module executable on the central processing unit and memory for immediately displaying on the display an environmental impact and a corresponding charitable impact of reuse of the reusable item over multiple reuses, thereby to provide immediate feedback of the cumulative environmental impact and charitable impact of reuse to the user; and a reward module executable on the central processing unit and memory for issuing a reward for reuse of the reusable item upon detecting that the reusable item has been reused over multiple reuses to achieve a cumulative environmental impact.

* * * * *